United States Patent Office 2,705,188
Patented Mar. 29, 1955

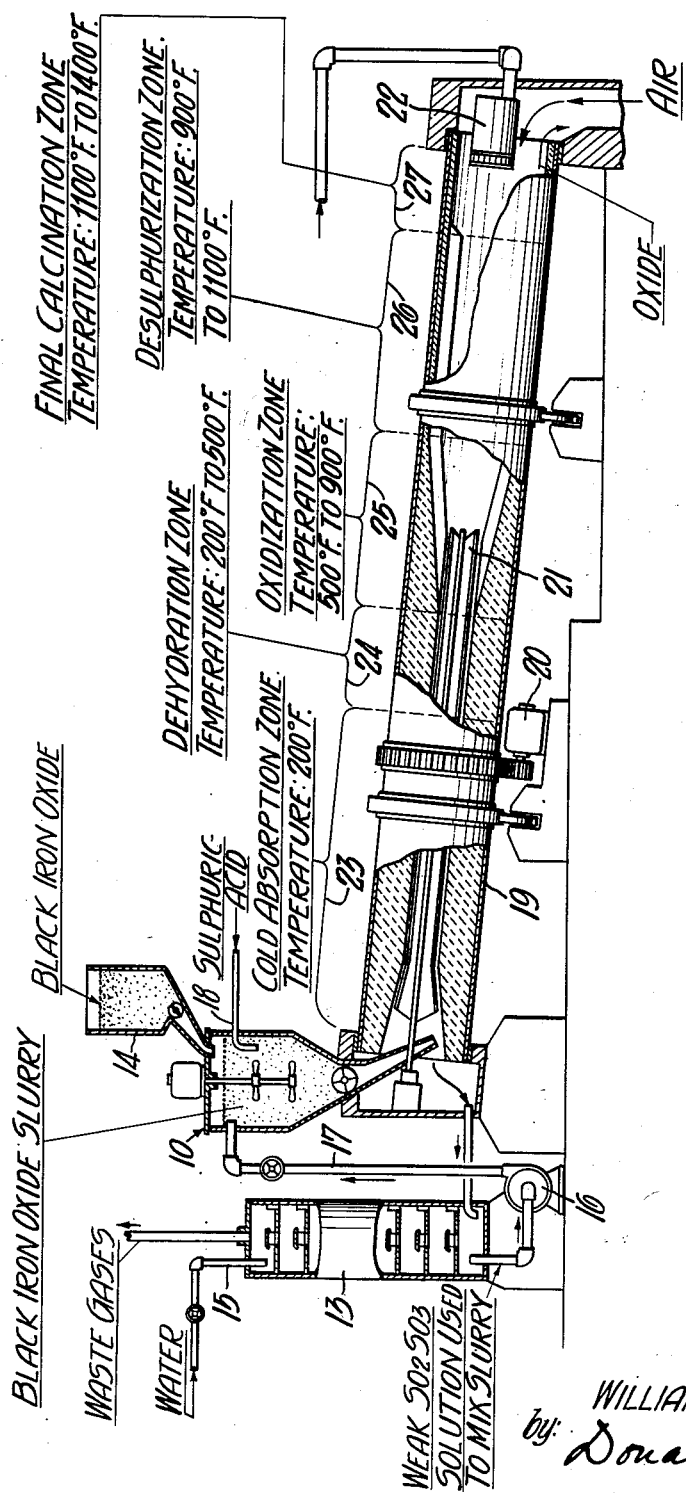

2,705,188

PROCESSES FOR CONVERTING BLACK IRON OXIDE TO RED IRON OXIDE

William A. Swaney, Pittsburgh, Pa., assignor to United States Steel Corporation, a corporation of New Jersey Application May 10, 1950, Serial No. 161,187

6 Claims. (Cl. 23—200)

This invention relates to improved processes for converting black iron oxide to red iron oxide suitable for pigments.

The usual way of converting black oxide to red oxide involves treating the black oxide with sulphuric acid and then roasting the intermediate product thus formed. It is known that the amount of acid can be considerably less than the stoichiometric amount needed to convert all the black oxide to a sulphate. The roasting temperature commonly is in the range 900° F. to 1500° F. and such roasting drives off the sulphur from the intermediate product, leaving a relatively pure red oxide. Castner et al. Patent No. 1,943,948, which issued January 16, 1934, and Perkins Patent No. 2,105,670, which issued January 18, 1938, describe typical prior processes of this sort. All such processes of which I am aware have been on a batch basis and there has been no provision for recovery of sulphuric acid.

Recently processes have been developed for disposing of steel mill waste pickle liquor in which the pickle liquor is treated with ammonia liquor and air under carefully controlled conditions to produce black iron oxide and ammonium sulphate. Wilson Patent No. 2,419,240, which issued April 22, 1947, and Thompson application Serial No. 83,227, which was filed March 24, 1949, describe and claim such processes. The black iron oxide is of high purity and exceedingly fine particle size (average particle diameter about 7 microns). Prior processes of which I am aware have been impractical for converting black oxide from these processes to red oxide because the intermediate product is a viscous sticky mass which cannot be handled readily for roasting on a commercial basis.

An object of the present invention is to provide improved processes for converting black iron oxide to the red oxide in which the process can be continuous and in which the sulphuric acid, or its anhydride, sulphur trioxide, can be recovered and recirculated.

A further object of the invention is to provide improved commercially practical conversion processes which are capable of using as their starting material black oxide of exceedingly fine particle size, such as the Wilson or Thompson processes produce.

According to the present invention, the black iron oxide first is mixed with water to form a slurry. It is necessary to use only sufficient water to form an actual slurry, although I prefer an excess of water to facilitate subsequent reactions. The slurry then is treated with gaseous sulphur trioxide, rather than liquid sulphuric acid as in previous processes. Initially there is a slow evolution of heat which is caused by solution of the sulphur trioxide in water. As introduction of sulphur trioxide continues, it attains a concentration at which there is a sudden and very pronounced exothermic reaction. At this stage the mixture is heterogeneous and the acid concentration is higher in some spots than in others. The reaction starts in the spots where the acid concentration is highest (in excess of 20% $H_2SO_4$) and then proceeds throughout the slurry. At the same time the slurry becomes streaked with whitish-gray lines. The quantity of sulphur trioxide which produces this reaction varies with the absorption conditions, such as the type of equipment and the flow rates. However, the quantity is approximately within the range of 10% to 20% of the stoichiometric quantity which would be needed to convert all the black iron oxide to a sulphate.

After the treated slurry has undergone this exothermic reaction, it becomes a thin mud-like mass, but it remains fluid and is not gummy like the product which treatment with sulphuric acid produces. The treated slurry is dehydrated and then roasted at a temperature within the range 900° F. to 1500° F., which drives off the sulphur compounds. The latter are evolved as gaseous sulphur trioxide and sulphur dioxide. The roasted product is a red oxide suitable for pigment use. It is essential that the sulphur be driven off almost completely or else the oxide product is deliquescent when cooled and unsuited for pigments.

Control of the hue and also the brilliance and saturation can be effected by varying the quantity of sulphur trioxide added to the slurry and by varying the roasting time and temperature. In general the more sulphur trioxide, the redder the hue. However, I find that addition of sulphur trioxide in excess of about 20% of the stoichiometric has little additional effect on the final products. The lowest practical temperature and shortest roasting time needed to effect complete desulphurization produce a red oxide which has the maximum brilliance. Although roasting at higher temperatures accelerates desulphurization, it produces a less brilliant oxide. If the roasting is continued past the point of desulphurization, it has a dulling effect on the oxide.

The process of the present invention conveniently operates continuously and recovers and recirculates the sulphur trioxide. The single figure of the drawing shows schematically a preferred apparatus for thus carrying out this process.

The apparatus comprises essentially an agitator 10, a rotary kiln 12 and an absorption column 13. Black iron oxide is introduced in a dry state to the agitator, as from a storage hopper 14. Water is introduced to the top of the absorption column at 15. As the water passes through this column, it absorbs effluent sulphur trioxide and sulphur dioxide from the kiln. A pump 16 transfers water from the bottom of the absorption column to the top of the agitator via a pipe 17. Make-up sulphur trioxide is introduced to the agitator at 18, preferably as dilute sulphuric acid. The sulphur trioxide in the solution in the agitator is kept at such a low concentration that there is no apparent reaction with the iron oxide. The maximum acid concentration in the agitator is 20% $H_2SO_4$, although I prefer that it be in the range of 2% to 5% $H_2SO_4$. The agitation is sufficient to prevent the concentration in localized regions exceeding the 20% maximum. The material discharged from the agitator is an easily handled slurry.

Rotary kiln 12 includes an elongated rotatable cylindrical body 19, a drive motor 20, and preferably a fixed scraper 21. A gas burner 22 is located at the discharge end of the kiln. The kiln has a series of zones of progressively increasing temperature. Starting at the feed end, these are a cold absorption zone 23, in which the temperature is less than 200° F., a dehydration zone 24, in which the temperature is in the range 200° F. to 500° F., an oxidation zone 25, in which the temperature is in the range 500° F. to 900° F., a desulphurization zone 26, in which the temperature is in the range 900° F. to 1100° F., and last a calcining zone 27, in which the temperature is in the range 1100° F. to 1400° F.

Slurry from the agitator feeds into the cold absorption zone 23 of the kiln, where it absorbs gaseous sulphur trioxide driven off the material farther along in the kiln. The sulphur trioxide thus absorbed plus the sulphuric acid already in the slurry reaches a sufficient concentration in spots that the exothermic reaction previously described takes place. Next the slurry passes to the dehydration zone 24 where the water is driven off, leaving a dry complex of sulphur and oxygen compounds of iron. Next the material passes to the oxidation zone 25 where the iron is oxidized to the ferric state by the action of heat and air. Next this material passes to the desulphurization zone 26, where the sulphur is driven off as sulphur trioxide, a small part of which dissociates to sulphur dioxide. Next the material passes to the calcination zone 27 where final calcination takes place. The red oxide which discharges from the calcination zone can be processed in any conventional way to form pigments or other useful products.

The gaseous products of combustion and any of the sulphur bearing gases which escapes absorption in the slurry in the cold absorption zone pass from the kiln into the absorption column 13. The input water absorbs the soluble gases which include the sulphur trioxide and the sulphur dioxide, and thus return these gases to the system. As far as I can determine, sulphur dioxide is inert in the reactions which take place in the kiln, but its presence seems harmless.

From the foregoing description, it is seen that the present invention provides a process for converting black iron oxide to red iron oxide in a continuous operation, and one in which the sulphuric acid constituent is largely recovered and recirculated. The use of gaseous sulphur trioxide in place of the usual sulphuric acid has the unobvious beneficial result of preventing the formation of intermediate products which are difficult or impossible to handle.

While I have shown and described a preferred embodiment of the invention, it is apparent that modifications may arise. Therefore, I do not wish to be limited to the disclosure set forth but only by the scope of the appended claims.

I claim:

1. A method of converting black iron oxide to red iron oxide comprising forming a water slurry of finely divided black iron oxide, introducing sulphur trioxide to said slurry in a maximum concentration insufficient to produce any apparent reaction with the iron oxide, introducing additional sulphur trioxide in gaseous form to the slurry until the latter contains localized regions where sulphuric acid concentration exceeds 20 per cent to start a pronounced exothermic reaction in said regions, which reaction proceeds through the slurry to form an intermediate iron sulphate product, the total quantity of sulphur trioxide introduced being about 10 to 20 per cent of the stoichiometric quantity needed to convert all the black iron oxide to iron sulphate, the intermediate product remaining fluid after undergoing said reaction, heating the intermediate product to a maximum temperature of 900° to 1500° F. to effect successively dehydration, oxidation and substantially complete desulphurization, and recovering the resulting red iron oxide.

2. A method of converting black iron oxide to red iron oxide comprising forming a water slurry of finely divided black iron oxide, introducing sulphur trioxide to said slurry in a maximum concentration insufficient to produce any apparent reaction with the iron oxide, introducing additional sulphur trioxide in gaseous form to the slurry until the latter becomes heterogeneous and contains spots of relatively high sulphuric acid concentration and spots of relatively low concentration to start a pronounced exothermic reaction in high acid spots where the concentration of sulphuric acid exceeds 20 per cent, which reaction proceeds through the slurry to form an intermediate iron sulphate product, the total quantity of sulphur trioxide introduced being about 10 to 20 per cent of the stoichiometric quantity needed to convert all the black iron oxide to iron sulphate, the intermediate product remaining fluid after undergoing said reaction, heating the intermediate product to effect successively dehydration, oxidation and substantially complete desulphurization, and recovering the resulting red iron oxide.

3. A method as defined in claim 2 in which the finely divided black iron oxide has an average particle diameter of about 7 microns.

4. A continuous method of converting black iron oxide to red iron oxide comprising forming a water slurry of finely divided black iron oxide, introducing sulphur trioxide to said slurry in a maximum concentration insufficient to produce any apparent reaction with the iron oxide, introducing additional sulphur trioxide in gaseous form to the slurry until the latter contains localized regions where sulphuric acid concentration exceeds 20 per cent to start a pronounced exothermic reaction in said regions, which reaction proceeds through the slurry to form an intermediate iron sulphate product, the total quantity of sulphur trioxide introduced being about 10 to 20 per cent of the stoichiometric quantity needed to convert all the black iron oxide to iron sulphate, the intermediate product remaining fluid after undergoing said reaction, heating the intermediate product to effect successively dehydration, oxidation and substantially complete desulphurization, recovering sulphur trioxide from desulphurization of the product for reintroduction to slurry, and recovering the resulting red iron oxide.

5. A continuous method of converting black iron oxide to red iron oxide comprising forming a water slurry of finely divided black iron oxide and sulphur trioxide of insufficient concentration to produce any apparent reaction, introducing additional sulphur trioxide in gaseous form to the slurry until the latter becomes heterogeneous and contains spots of relatively high sulphuric acid concentration and spots of relatively low concentration to start a pronounced exothermic reaction in high acid spots in the slurry where the concentration of sulphuric acid exceeds 20 per cent, which reaction proceeds through the slurry to form an intermediate iron sulphate product, the total quantity of sulphur trioxide introduced being about 10 to 20 per cent of the stoichiometric quantity needed to convert all the black iron oxide to iron sulphate, the intermediate product remaining fluid after undergoing said reaction, heating the intermediate product to a maximum temperature of 900° to 1500° F. to effect successively dehydration, oxidation and substantially complete desulphurization, recovering sulphur trioxide from desulphurization of the product, reintroducing the recovered sulphur trioxide to additional slurry in which the oxide is undergoing conversion, and recovering the resulting red iron oxide.

6. A continuous method of converting black iron oxide to red iron oxide comprising forming a water slurry of finely divided black iron oxide and sulphur trioxide of insufficient concentration to produce any apparent reaction, introducing additional sulphur trioxide in gaseous form to the slurry until the latter becomes heterogeneous and contains spots of relatively high sulphuric acid concentration and spots of relatively low concentration to start a pronounced exothermic reaction in high acid spots in the slurry where the concentration of sulphuric acid exceeds 20 per cent, which reaction proceeds through the slurry to form an intermediate iron sulphate product, the total quantity of sulphur trioxide introduced being about 10 to 20 per cent of the stoichiometric quantity needed to convert all the black iron oxide to iron sulphate, the intermediate product remaining fluid after undergoing said reaction, heating the intermediate product to a maximum temperature of 900° to 1500° F. to effect successively dehydration, oxidation and substantially complete desulphurization, recovering sulphur trioxide from desulphurization of the product, introducing the recovered sulphur trioxide in gaseous form to additional slurry, absorbing in the water which is used to form the slurry sulphur trioxide which escapes absorption in the slurry, and recovering the resulting red iron oxide.

References Cited in the file of this patent

UNITED STATES PATENTS

| 1,415,897 | Reed | May 16, 1922 |
| 1,489,347 | Davison | Apr. 8, 1924 |
| 1,813,649 | Weise | July 7, 1931 |
| 1,943,948 | Castner | Jan. 16, 1934 |
| 2,105,670 | Perkins | Jan. 18, 1938 |
| 2,394,579 | Ayers | Feb. 12, 1946 |
| 2,416,138 | Ayers | Feb. 18, 1947 |
| 2,433,498 | Whitford | Dec. 30, 1947 |
| 2,608,468 | Nahas | Aug. 26, 1952 |

FOREIGN PATENTS

| 409,936 | Great Britain | May 10, 1934 |

OTHER REFERENCES

Mellor, "Comprehensive Treatise on Inorganic Chemistry," vol. 10, pages 334, 344 (1930); Longmans, Green and Co., New York City.

Mellor, "Comprehensive Treatise on Inorganic and Theoretical Chemistry," vol. 14, pages 245, 246 and 303 (1935); Longmans, Green and Co., New York.

Lunge et al., "Sulphuric Acid and Sulphur Dioxide, Raw Materials," vol. 1 by W. Wyld, page 191; D. Van Nostrand Co., New York City (1923).